United States Patent

[11] 3,576,333

| [72] | Inventors | Gunnar H. Danielson |
| | | Minneapolis, Minn.; |
| | | Harold W. Oncken, Hermann, Mo. |
| [21] | Appl. No. | 803,819 |
| [22] | Filed | Mar. 3, 1969 |
| [45] | Patented | Apr. 27, 1971 |
| [73] | Assignee | Valley Craft Products, Inc. |
| | | Lake City, Minn. |

[54] PALLET TRUCK
9 Claims, 6 Drawing Figs.

[52] U.S. Cl. ................................................. 280/34,
280/43.12, 280/150
[51] Int. Cl. ..................................................... B62b 21/14
[50] Field of Search ........................................ 280/43.23,
43.12, 43.17, 150 (A), 150 (P), 79.1, 47.11, 400,
415; 214/621; 254/8.2

[56] References Cited
UNITED STATES PATENTS

| 1,441,419 | 1/1923 | Hart | 280/150(P) |
| 2,950,121 | 8/1960 | Fisher | 280/47.11 |
| 2,993,703 | 7/1961 | Paradise | 280/43.12 |
| 2,996,307 | 8/1961 | Debailleux | 280/34.1 |
| 3,066,946 | 12/1962 | Nelson | 280/79.1 |
| 3,438,649 | 4/1969 | Schermerhorn | 280/259 |

Primary Examiner—Leo Friaglia
Assistant Examiner—Robert R. Song
Attorney—Hill, Sherman, Meroni, Gross & Simpson ABSTRACT: A pallet truck which has projecting forks thereon adapted to extend through material pallets and project beyond the pallets at both ends and which has detachable wheels for assembly on the ends of the forks with the wheels operable in a plane transverse to the plane of projection of the forks so as to allow lateral movement of the pallet truck.

PATENTED APR 27 1971

INVENTORS
GUNNAR H. DANIELSON
HAROLD W. ONCKEN

BY Hill, Sherman, Meroni, Gross & Simpson
ATTORNEYS

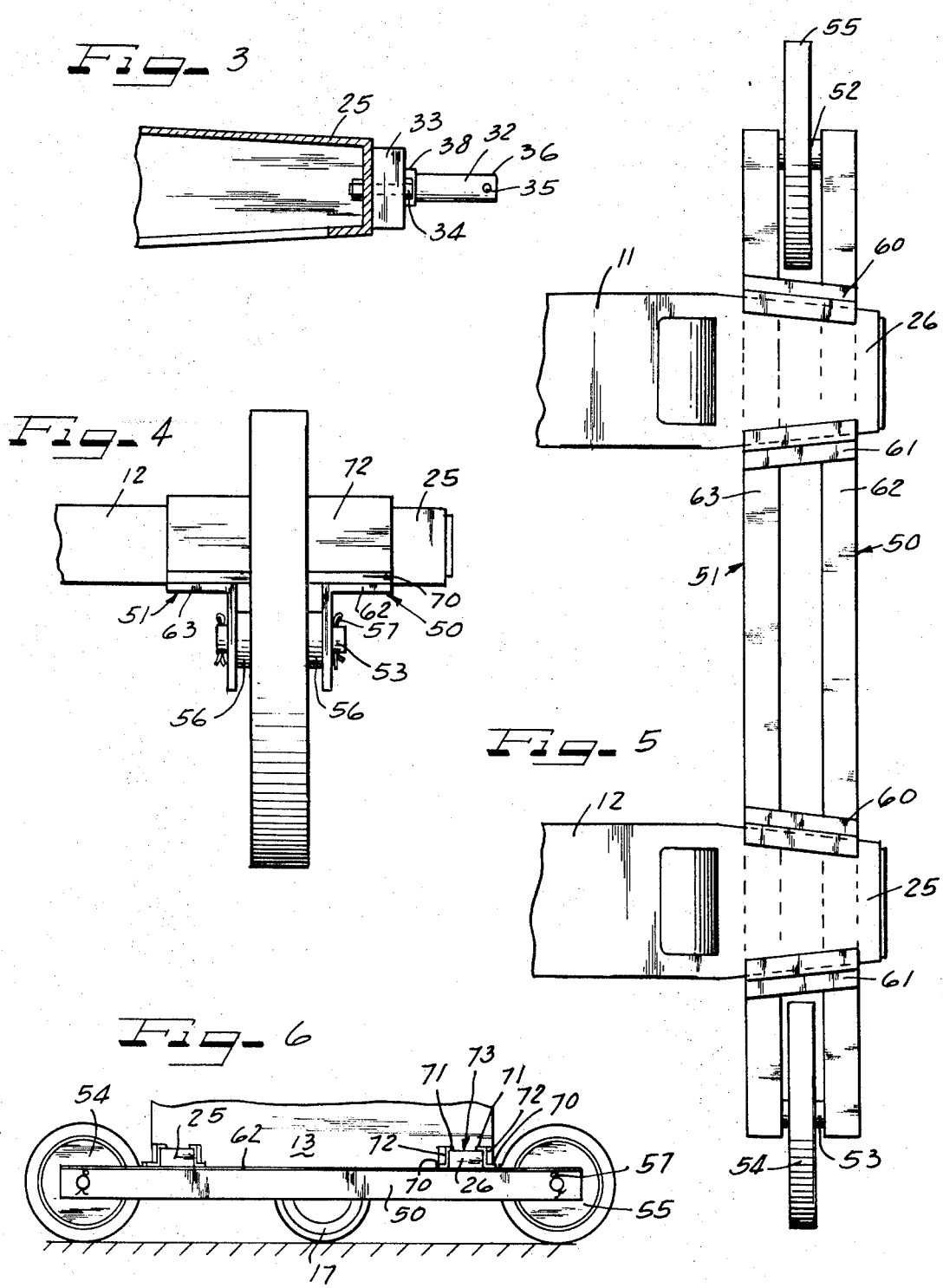

PALLET TRUCK

BACKGROUND OF THE INVENTION

1. Field of the Invention

This invention relates to pallet trucks and more particularly to detachable wheels for pallet trucks allowing lateral movement of the truck.

2. Prior Art

Material handling pallet trucks are well known in the art. Most pallet trucks suitable for hand operation in confined areas have a back wheel arrangement supporting one end of a material handling projection which has two legs or forks adapted to extend through the pallet. The forks carry pivotable wheels which raise and lower the forks to lift the pallet off of the floor. Such wheels are capable of movement only in the forward plane, i.e., the plane of projection of the forks.

In those instances where it is necessary to transport relatively lengthy pieces of cargo on a pallet truck, the pieces must be carried transversely to the truck. Due to the inability of the truck to travel in a direction transverse to the plane of projection of the forks, it is impossible to carry such lengthy cargo through narrow aisles.

SUMMARY

The disadvantage of the prior art is overcome by the present invention which provides for detachable wheels which may be assembled on the forward ends of the forks which project through the pallet. The wheels operate in a plane transverse to the plane of projection of the forks and combine with the pivotable rear wheel of the truck to allow the truck to move in a transverse direction.

The wheels are dimensioned to have a radius which is less than the distance from the point where their axes will lie when attached to the truck to the running surface or floor when the forks are in their raised position, but greater than the distance from that point to the running surface when the forks are in their lowered position. In this way, after the fork has been projected through the pallet, the fork can be raised to lift the pallet off the floor in the normal manner. The wheels may then be assembled on the ends of the forks. Thereafter lowering of the forks will cause the detachable wheels to contact the running surface. Further attempted lowering of the forks will cause retraction of the pivotable wheels of the fork which will lift them off the running surface so that they do not interfere with lateral movement of the pallet truck. When it is again desired to resume normal directional movement, it is only necessary to actuate the pivotable wheels of the forks to raise the forks thereby lifting the detachable wheels off of the running surface.

In one embodiment the detachable wheels are adapted to be received on short projecting axles which extend out from the ends of the fork. The wheels may be held on the axles by simple pins. In another embodiment, a crossbar having clamps adapted to be slipped over the ends of the fork is provided, the crossbar carrying the wheels.

It is therefore an object of this invention to provide a pallet truck cable of movement in a sidewise direction.

It is another object of this invention to provide detachable wheels for use in connection with pallet trucks, which when assembled on the truck, allow the truck to move in a sidewise direction.

It is yet another object of this invention to provide a kit for adapting pallet trucks to move in a sidewise direction.

It is yet another and more specific object of this invention to provide detachable wheels for use in connection with pallet trucks, which wheels can be attached to axles projecting longitudinally from the free ends of the pallet truck forks, which wheels are effective to support the forks in a semiraised position allowing retraction of the nondirigible wheels of the truck to provide for sidewise movement of the pallet truck.

It is yet another specific object of this invention to provide detachable wheels for use in connection with pallet trucks which wheels are attached to elongated crossbars which carry clamping means for assembling the crossbars on the free ends of the pallet truck forks so that the detachable wheels may support the forks in a semiraised position allowing retraction of the nondirigible wheels of the pallet truck to provide for sidewise movement of the truck.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 3 is a fragmentary sectional view of the forward end of one of the forks of the pallet truck of FIGS. 1 and 2.

FIG. 4 is a fragmentary side plan view of a modified form of this invention.

FIG. 5 is a fragmentary top plan view of the forward end of the forks of a pallet truck equipped with the modified embodiment of this invention illustrated in FIG. 4.

FIG. 6 is a fragmentary front plan view of a pallet truck equipped with the embodiment of FIGS. 4 and 5.

DESCRIPTION OF THE PREFERRED EMBODIMENTS

Figures 1, 2:
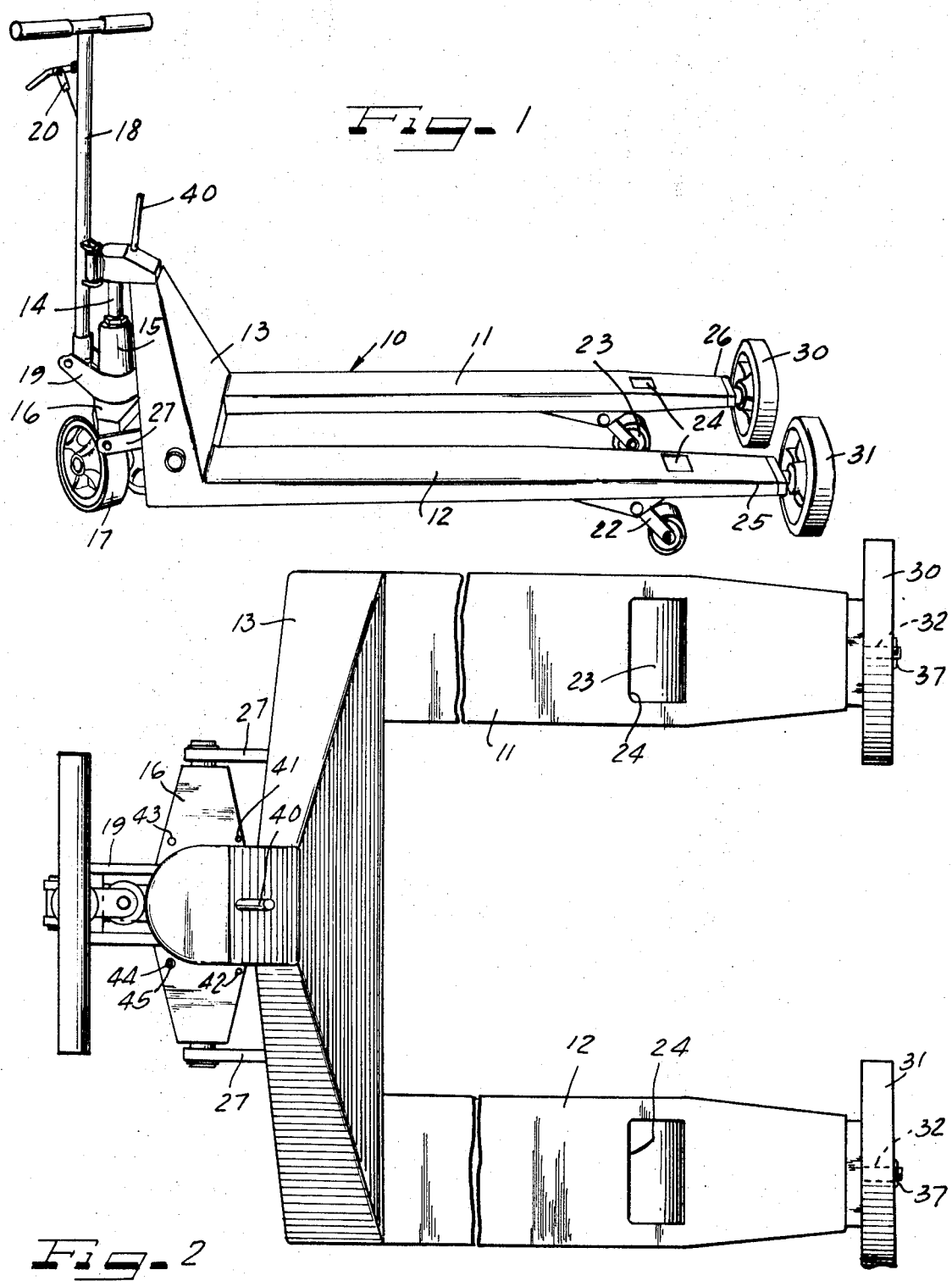
FIG. 1 is a perspective view of a pallet truck equipped with the device of this invention.
FIG. 2 is a fragmentary top plan view of the pallet truck of FIG. 1.

FIG. 1 illustrates a hand-operated pallet truck 10 of the conventional type having elongated forks 11 and 12 projecting outwardly in parallel relationship from a back member 13. The back member 13 is attached to the piston rod 14 of a fluid actuator 15. The actuator 15 bottoms on a stationary brace 16 which in turn rests upon a dirigible tandem wheel set 17. The wheel set 17 is steered by a handle 18 which handle is also operatively connected to a fluid pump (not shown) connected to the actuator 15 in such a way that when the handle is pumped, it actuates the fluid pump to move the piston rod 14.

The handle 18 is attached to a collar 19 above the stationary brace 16, the collar being rotatable with respect to the brace 16 and operatively connected to the wheel set 17. It can therefore be seen that moving the handle 18 from side to side steers the dirigible wheel set 17 while moving it up and down actuates the pump and the actuator 15. A release mechanism 20 is provided to selectively release the pressure in the actuator 15.

In a normal condition with the pressure in the actuator at atmospheric, the piston rod 14 is unextended and the bottom plane of the forks 11 and 12 and the back member 13 extends off the floor a short distance. Each of the forks 11 and 12 has associated therewith a pivoted wheel 22, 23 which is in the nature of a roller having its axis in a plane transverse to the forks 11 and 12. The wheels 22 and 23 support the front end of the pallet truck 10 while the dirigible wheel 17 supports the rear. In the lowered position of the pallet truck, the uppermost portion of the roller wheels 22 and 23 may project through openings 24 in the top of the forks 11 and 12, thereby giving the pallet truck forks a low silhouette. In this position, the truck is adapted to pass through a standard material pallet with the ends 25 and 26 of the forks 11 and 12 projecting from the other side of the pallet.

The roller wheels 23 and 24 are pivotably attached to the forks 11 and 12 and are connected through a pivot-lever arrangement to arms 27 which are pivotably connected to the stationary brace 16. When the handle 18 is moved up and down to actuate the fluid actuator 15, the piston rod 14 is forced out of the cylinder lifting the back member 13 of the pallet truck to a higher plane. At the same time, the lever and pivot arrangement connecting the roller wheels 23 and 24 with the stationary brace 16 pivots the wheel connections to force the wheels 22 and 23 in a direction downwardly with respect to the forks, thereby lifting the forks to a higher plane. This action will lift a pallet off the floor when the forks 11 and 12 are extended through the pallet. Thereafter, pushing or pulling the truck 10 will allow the operator to easily move the pallet which may be loaded with material. It is to be understood that the truck as described above is a representative form of a prior art pallet truck which can be adapted to utilize the present invention. Although this one type of truck has been described, it is to be understood that the invention can be practiced in connection with other pallet trucks.

The pallet truck 10 as described is capable only of forward, backward and turning movement due to the provision of the cylindrical roller wheels 22 and 23 which, by their nature, are incapable of sidewise or axial rolling movement. Where it is desired to transport elongated objects, it is necessary to lay them transversely to the forks 11 and 12 so that their centers of gravity may lie above the pallet truck. In such a position, due to the lack of ability of the truck to move sidewise, it is impossible to transport the elongated materials through narrow aisles. It is therefore the object of this invention to adapt such pallet trucks to movement in a sidewise direction. The invention accomplished this object through the provision of a pair of detachable wheels 30 and 31 whose axes extend in the same direction as the forks 11 and 12.

As illustrated in FIG. 3, an axle 32 is provided which is attached to a mounting block 33 adapted to be fastened onto the ends 25 and 26 of the forks 11 and 12 by means such as nuts and bolts 34, or by welding, brazing or the like. The axle 32 and mounting block 33 are dimensioned so as to fit onto the end of the forks 11 and 12 with the axles 32 projecting forward therefrom in such a manner that they do not interfere with the normal operation of the pallet truck. The axle 32 and mounting block 33 will not interfere with the insertion of the forks through a pallet. A small diameter hole 35 may be bored through the axle 32 adjacent the forward end thereof. The wheels 30, 31 have axial bores dimensioned to receive the axle 32 with the forward end 36 projecting beyond the wheel. Removable locking pins 37 (FIG. 2) may be inserted into the bores 35 to retain the wheels 30, 31 on the axles 32. Spacing collars 38 may be provided around the axles 32 adjacent the mounting block 33 to prevent the wheels 30, 31 from contacting the mounting block. It is of course to be understood that other methods such as projecting central hubs may be utilized to prevent binding contact between the wheels and the mounting blocks. The wheels 30, 31 have a radius which is greater than the distance from the center of the axles 32 to the bottom of the roller wheels 22, 23 when the pallet truck is in its lowered position but less than that distance when the truck is in its raised position.

It is necessary to raise the pallet truck from its lowered position before the wheels 30, 31 can be placed on the axles 32. Thereafter, lowering the pallet truck will bring the wheels 30, 31 into contact with the floor and further "lowering" of the truck will cause the wheels 30, 31 to support the front end of the pallet truck while the roller wheels 22, 23 will be drawn upwardly out of contact with the floor. As soon as this occurs, the "lowering" of the pallet truck can be stopped and the truck will now be supported by the wheel set 17 and the detachable wheels 30, 31. Thereafter, turning the handle 18 until the wheel set 17 can roll in the same direction as the wheels 30, 31 will allow the pallet truck to be moved sidewise. When it is again desired to move the truck in a forward or reverse direction, it is only necessary to raise the truck by operating the fluid actuator 15 until the roller wheels 22 and 23 are in contact with the floor and the detachable wheels 30 and 31 have been lifted off the floor.

The provision of the locking pins 37 allows the detachable wheels 30 and 31 to be quickly and easily mounted and unmounted on the axles 32. The locking pins 37 may be simple rings adapted to be gripped by a finger and attached to elongated shafts adapted to extend through the bore 35. When it is desired to load or unload a pallet, the detachable wheels 30 and 31 must be removed from the end of the forks 11 and 12. In order to provide storage for the wheels at such times, a shaft 40 may be provided at the top of the backwall 13 for spindling the wheels.

During sidewise movement of the pallet truck, it is desirable that the wheel set 17 be locked to roll in a direction 90° from the longitudinal axis of the pallet truck. Any suitable type of locking mechanism can be employed, such as the one illustrated in FIG. 2. The collar 19 attaching the handle 18 to the remainder of the pallet truck lies above the plane of the stationary brace 16 and with the wheels at their right-angled position, the collar 19 overlies the top surface of the stationary brace 16. Therefore, pins 41 and 42 may be formed integrally with the stationary brace 16 and project upwardly therefrom. The pins 41 and 42 are spaced to either side of the centerpoint of the stationary brace 16 at the point where they will abut the collar 19 when the wheels have been turned 90° from the longitudinal axis of the pallet truck. This will prevent the collar from further swinging limiting the maximum turn of the wheels to 90°. Spaced apart from the pins 41 and 42 by a distance equal to the thickness of the collar 19 are openings 43 and 44 which extend into the stationary brace 16. Removable pins 45 may be inserted into the openings 43 and 44 which extend into the stationary brace 16, and when inserted, will project above the plane of the stationary brace 16. If after the collar 19 is turned until it abuts one of the pins 41 or 42, the removable pin 45 is placed in the opening 43 or 44 adjacent the pin 41 or 42 which the collar is contacting, the removable pin will thereafter contact the other side of the collar entrapping the collar between the removable pin and the stationary pin and locking the wheel set 17 in position for sidewise movement of the pallet truck, enabling it to roll in a straight line, even when the pulling force is applied offcenter.

FIGS. 4, 5 and 6 illustrate a modified form of the invention where the detachable wheels are positioned at either end of an elongated support device which is adapted to be detachably affixed to the ends of the forks.

Two spaced-apart right-angled elongated bars 50 and 51 are equipped with transverse axles 52 and 53 adjacent either end thereof. The axles project through wheels 54 and 55, which may have axially protruding hubs 56. The axles 52 and 53 may be attached to the bars 50 and 51 by means of cotter pins 57, or the like fastening devices. The bars 50 and 51 are of such a length that when positioned transverse to the pallet truck, the wheels 54 and 55 extend beyond the forks 11 and 12. Intermediate the ends of the bars 50 and 51, pairs of Z-shaped bars 60 and 61 are fastened on the top plane of the bars 50 and 51. The Z-shaped bars 60 and 61 can be fastened by welding, brazing or other methods. The elongated right angle metal bars 50 and 51 are assembled in spaced-apart back-to-back relationship with the diverging flange portions 62 and 63 at the top thereof forming a plane parallel to the axial plane of the wheels 54 and 55. The Z-shaped bars 60 and 61 are fastened to the elongated right angle bars 50 and 51 atop this plane.

The Z bars 60 and 61 in each pair of bars are spaced apart and are assembled in opposed relationship with their bottom flanges 70 projecting outwardly away from each other and their top flanges 71 projecting inwardly. The bottom flanges 70 are attached to the top flange portions 62 and 63 of the right-angle bars, and the combination of the top flanges 71 of the Z-bars, the vertical intermediate section 72, and the top flanges 62 and 63 of the right-angle bars serve to define an open rectangular cross section chamber 73 between the Z-bars 60 and 61 of each pair of Z-bars. The bars 60 and 61 are spaced apart a sufficient distance and may be angled with respect to each other so that the chamber 73 is adapted to receive in tight-fitting relationship the ends 25 and 26 of the forks 12, 11. Additionally, the pairs of Z-bars are spaced apart a distance equal to the space between the forks 11 and 12 so that the entire assembly may be slipped on to the end of the forks 11 and 12 with the right-angle bars 50 and 51 underlying the ends 25 and 26 of the forks and the top flanges 71 of the Z-bars overlying portions of the tops of the ends 25 and 26 of the forks.

Again, in this embodiment, the diameter of the wheels 54 and 55 is chosen such that the pallet truck must be initially lifted from its lowest position before the wheel assembly can be attached to the end of the forks. Thereafter, lowering of the pallet truck will bring the wheels 54 and 55 into contact with the ground while lifting the pivot roller wheels 22 and 23 off of the ground to allow sidewise movement of the pallet truck.

It can therefore be seen from the above that both embodiments of our invention provide apparatus for allowing sidewise movement of a pallet truck. Both embodiments provide detachable wheel assemblies adapted to be attached adjacent the forward ends of the forks of a pallet truck, the wheels operating transversely to the direction of projection of the forks whereby when the truck is lowered to bring the detachable wheels into contact with an operating surface such as a floor, the pallet truck will be supported by its dirigible wheels and the detachable wheels, thereby allowing sidewise movement of the truck. Although the devices have been described in connection with a pallet truck, it is to be understood that either embodiment may be incorporated in a kit for modifying existing pallet trucks.

Although we have herein set forth our invention with respect to certain specific principles and details thereof, it will be understood that these may be varied without departing from the spirit and scope of the invention as set forth in the hereunto appended claims.

We claim:

1. Auxiliary wheel structure for use with a pallet truck having pivotable wheel apparatus for raising and lowering pallet forks attached to the truck with respect to an operating surface and dirigible wheel apparatus for steering and supporting the truck, said structure comprising:
   detachable wheels adapted to be attached to the forks of the pallet truck adjacent the free ends thereof,
   the ends of said forks opposite the said free ends being supported by the said dirigible wheel apparatus,
   means for attaching said wheels,
   said detachable wheels having a diameter sufficient to support the forks of the pallet truck on an operating surface at a height above said surface sufficient to allow the pivotable wheel apparatus to be raised off of the operating surface while maintaining contact between said surface and said dirigible wheel apparatus, and
   said wheels when attached to said forks operating at right angles to the direction of projection of the forks so as to provide for sidewise movement of the pallet truck.

2. A pallet truck comprising:
   a forked bed having two spaced-apart projecting forks, said forks joined together at one end through a back member,
   said bed supported by dirigible wheels and nondirigible wheels,
   means for extending and retracting the said nondirigible wheels to raise and lower said forks above an operating surface,
   a pair of detachable wheels,
   means for attaching said detachable wheels to said forks adjacent their ends remote from said back member,
   said detachable wheels, when attached, enabling rolling at right angles to the direction of projection of the forks, and
   said detachable wheels dimensioned diameterwise to be attachable to said forks when said nondirigible wheels are in at least a partially extended state, and said detachable wheels dimensioned diameterwise to project below said nondirigible wheels when said nondirigible wheels are in a fully retracted position whereby said forks will be supported on said operating surface by said detachable wheels and said nondirigible wheels will be free from the operating surface.

3. A pallet truck according to claim 2 wherein the means for attaching the detachable wheels to the forks comprises:
   an axle projecting from said remote end of each of said forks in the direction of projection of said forks,
   said axles sized to project through an axial bore in said detachable wheels,
   and means on said axles for retaining said detachable wheels on said axles.

4. A pallet truck according to claim 3 wherein the means for retaining the detachable wheels on the axles comprises:
   a bore extending diametrically through each of said axles,
   and a pair of retaining pins adapted to extend into each said bore and to project therefrom on either side of the said axle to entrap the detachable wheels between the projecting portions of the retaining pins and said remote ends of the said forks.

5. A pallet truck according to claim 2 wherein said means for attaching said detachable wheels to said forks comprises:
   elongated crossbar apparatus having the detachable wheels operatively fastened adjacent the opposite ends thereof, and
   retaining means attached to said crossbar apparatus intermediate the ends thereof, and adapted to interfit with portions of said remote ends to retain the said crossbar apparatus adjacent said remote ends.

6. A pallet truck according to claim 5 wherein said retaining means comprises open rectangular cross section chambers dimensioned to receive said remote ends of the forks therethrough in tight fit relationship.

7. A kit for adapting a pallet truck, having projecting forks which may be raised and lowered by extending and retracting nondirigible wheels, for movement in a direction transverse to the direction of projection of the forks which comprises:
   a plurality of axles,
   means for mounting said axles on the forward ends of the forks, said axles when mounted projecting from the ends of the forks in the direction of projection of the forks,
   a plurality of wheels having axial bores sized to receive said axles, means for retaining said wheels on said axles, and
   said wheels dimensioned to have a radius less than the distance from said axles to the bottom of the nondirigible wheels when the nondirigible wheels are in their extended state but greater than the distance from said axles to the bottoms of the nondirigible wheels when the nondirigible wheels are in their fully retracted state.

8. A kit for adapting a pallet truck, having projecting forks which may be raised and lowered by extending and retracting nondirigible wheels, for movement in a direction transverse to the direction of projection of the forks which comprises:
   elongated crossbar apparatus,
   said crossbar apparatus having transverse axles adjacent opposite ends thereof,
   a plurality of wheels, said wheels having axial bores sized to receive said transverse axles,
   retaining means attached to said crossbar apparatus, said retaining means adapted to attach said crossbar apparatus to the forward ends of the forks transversely to the forks, and
   said wheels dimensioned to have a radius less than the distance from said axles to the bottoms of the nondirigible wheels when the nondirigible wheels are in their extended state but greater than the distance from said axles to the bottoms of the nondirigible wheels when the nondirigible wheels are in their fully retracted state.

9. A pallet truck according to claim 2, including means carried by the pallet truck for locking said dirigible wheels to roll only in a direction parallel to that of said detachable wheels.